United States Patent
Okubo et al.

(10) Patent No.: US 6,212,222 B1
(45) Date of Patent: Apr. 3, 2001

(54) INITIAL ACQUISITION CIRCUIT

(75) Inventors: Seiji Okubo; Akinori Fujimura; Takashi Asahara; Toshiharu Kojima, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/482,869

(22) Filed: Jan. 14, 2000

(30) Foreign Application Priority Data

Jan. 20, 1999 (JP) .................................................. 11-011456

(51) Int. Cl.[7] .................................................. H04B 1/707
(52) U.S. Cl. ............................................. 375/149; 375/147
(58) Field of Search .................................. 375/130, 137, 375/140, 147, 149

(56) References Cited

U.S. PATENT DOCUMENTS

| | | | |
|---|---|---|---|
| 4,346,470 | * 8/1982 | Alvarez, III et al. | 370/324 |
| 5,280,538 | * 1/1994 | Kataoka et al. | 375/149 |
| 5,488,629 | * 1/1996 | Takahashi et al. | 375/206 |
| 5,568,472 | 10/1996 | Umeda et al. | |
| 5,577,025 | 11/1996 | Skinner et al. | |
| 5,579,338 | * 11/1996 | Kojima | 375/149 |

FOREIGN PATENT DOCUMENTS

| | | |
|---|---|---|
| 4360434 | 12/1992 | (JP) . |
| 6197096 | 7/1994 | (JP) . |

OTHER PUBLICATIONS

Yokoyama, Mitsuo, "Spectrum-Spreading Communication System", May 10, 1988, pp. 1–6.

* cited by examiner

Primary Examiner—Temesghen Ghebretinsae

(57) ABSTRACT

In the identical spread code multiplex SS system, a delay correction unit and a multiplexer calculates the multiplexed square correlation value by matching the peak values and adding the square correlation values of all the multiplexed signals. The multiplexed signals are the signals obtained by multiplexing an RF signal in such manner that different specific delay times are respectively given to parallel transmission information sequences multiplied by identical spread codes. Therefore, code synchronization can be realized by using only one correlator for both the orthogonal and an in-phase components.

4 Claims, 11 Drawing Sheets

US 6,212,222 B1

INITIAL ACQUISITION CIRCUIT

FIELD OF THE INVENTION

The present invention relates to an initial acquisition circuit in which, in a direct sequence spread spectrum communication scheme, spectrum spreading is performed on parallel data sequences by using identical spread code sequences, and, thereafter, code synchronization between a spread code sequence multiplied by a transmission signal multiplexed with a time offset and a spread code sequence used in a correlator on a reception device side is performed.

BACKGROUND OF THE INVENTION

In recent years, in a mobile communication system or a satellite communication system, there is considered a code division multiplex connection communication scheme using a spread spectrum scheme serving as one of the traffic transmission schemes of images, voice, data, or the like.

The direct sequence scheme, which is one of the spread spectrum communication schemes, is a scheme in which a spread code sequence in a band considerably wider than that of an information signal is directly multiplied by the information signal to spread the information signal during communication.

An initial acquisition circuit is used to establish a code synchronization between a spread code sequence multiplied on transmission side and a spread code sequence used in a correlator on a reception side. In the following explanation, a code synchronization state is a state in which the phase of a spread code multiplied by a reception signal and the phase of a spread code used in a correlator are equal to each other in data demodulation.

FIG. 8 is a block diagram of a transmission device and FIG. 9 is a block diagram of a reception device of a spread spectrum communication system (to be referred to as the identical spread code multiplex SS system hereinafter), described in Japanese Patent Application Laid-Open No. 6-197096, in which spectrum spreading is performed on conventional parallel data by using identical spread codes, and, thereafter, multiplexing is performed with a time offset.

FIG. 8 is a block diagram showing a transmission device of a conventional identical spread code multiplex SS system. In FIG. 8, reference numeral 211 denotes a data generator; reference numeral 212 denotes a serial/parallel converter; reference numeral 213 denotes a clock generator; reference numeral 214 denotes a spread code generator; reference numerals 22(1) to 22(n) denote spread modulators; reference numerals 23(1) to 23(n) denote delays; reference numeral 241 denotes a multiplexer; reference numeral 242 denotes a frequency converter; reference numeral 243 denotes a power amplifier; and reference numeral 244 denotes a transmission antenna.

Operation of the transmission device of the conventional identical spread code multiplex SS system will be explained below. The data generator 211 of the transmission device of the conventional identical spread code multiplex SS system generates a digital information signal having a value of "1" or "−1". In the following explanation, a generation rate of digital information signals is called a bit rate, and the value of the bit rate of the digital information signals is expressed as $R_b$. The digital information signal is converted by the serial/parallel converter 212 into parallel information signals of n channels. The multiplex number n is equal or smaller than a spread code length L [bit]. In addition, in the following explanation, a generation rate of parallel information signals in each channel is called a parallel bit rate, and the value of the parallel bit rate is expressed as $R_p$ ($=R_b/n$). Thus, a spread code sequence used in the transmission device of the conventional identical spread code multiplex SS system is generated by the spread code generator 214, which generates values of "1" or "−1". The spread code sequence has a code length L [bit], and a clock frequency band of $R_p \times L$ generated by the clock generator 213.

Codes such as M-sequence codes or Gold codes which are formed by a simple code forming circuit configuration in which autocorrelation and cross correlation between the codes are small, are used as the spread code sequence. In the following explanation, a clock rate generated by the clock generator 213 is called a chip rate $R_c$ ($=R_p \times L$), and a clock cycle having the chip rate $R_c$ is called a chip cycle $T_c$ ($=1/R_c$). In the spread modulators 22(1) to 22(n), the parallel information signals of the n channels are multiplied by the spread code generated by the spread code generator 214 to generate parallel spread spectrum signals of n channels. Each parallel spread spectrum signal has the chip rate $R_c$.

N different delay times $\{\tau_1 T_c, \tau_2 T_c, \tau_3 T_c, \ldots, \tau_n T_c\}$ are given in the delay units 23(1) to 23(n) to the parallel spread spectrum signal sequence of the n channels. In the following description, $\{\tau_1, \tau_2, \tau_3, \ldots, \tau_n\}$ are called delay coefficients, and the delay coefficients $\{\tau_1, \tau_2, \tau_3, \ldots, \tau_n\}$ are integers which satisfy $0 \leq \tau_1 < \tau_2 < \tau_3 < \ldots < \tau_n < L$. Thereafter, all the delayed parallel spread spectrum signals of the n channels are added to each other by the multiplexer 241 to generate a multiplexed spread spectrum signal. Although the parallel information signals of the parallel spread spectrum signal sequence of the n channels are spectrum-spread by identical spread code sequences, since the parallel spread spectrum signal sequence is multiplexed with different delay times, crosscorrelation between the signals of data sequence in code synchronization of the data sequence have small values.

Further, the frequency of the multiplexed spread spectrum signal is converted into a radio frequency (RF) by the frequency converter 242. Thereafter, the power of the multiplexed spread spectrum signal is amplified by the power amplifier 243 to generate a multiplexed RF signal. The multiplexed RF signal is transmitted to a communication destination using the transmission antenna 244.

FIG. 9 is a block diagram showing a reception device of a conventional identical spread code multiplex SS system. In FIG. 9, reference numeral 311 denotes a reception antenna; reference numeral 312 denotes an RF amplifier; reference numeral 111 denotes a quasi-coherent detector; reference numeral 112 denotes a correlation value calculator; reference numeral 141 denotes an initial acquisition unit; reference numeral 313 denotes a parallel/serial converter; reference numerals 32(1) to 32(n) denote delay correcting units; and reference numerals 33(1) to 33(n) denote data demodulators. The quasi-coherent detector 111 comprises a voltage controlled oscillator (VCO) 341, a π/2-phase shifter 342, multiplexers 343 and 344, lowpass filters 345 and 346, A/D converters 347 and 348, and the correlation calculator 112 comprises an in-phase correlation calculator 351 and an orthogonal correlation value calculator 352.

Operation of a reception device of a conventional identical spread code multiplex SS system will be described below. In FIG. 9, the RF amplifier 312 in the reception device of the conventional identical spread code multiplex SS system RF-amplifies a multiplexed RF signal transmitted from the transmission device of the conventional identical spread code multiplex SS system explained above received through the reception antenna 311. In the quasi-coherent detector 111, a local carrier wave having a frequency band of a chip rate $R_c$ output from the VCO 341 and the RF-amplified multiplexed RF signal are multiplied together by the multiplexer 343. A harmonic component is removed from the resultant signal by the lowpass filter 345. This signal is then converted into digital data by the A/D converter 347, so that an in-phase component of a complex spread spectrum signal included in the frequency band of the chip rate $R_c$ is generated.

Similarly, in the quasi-coherent detector 111, a local carrier wave having a chip rate $R_c$ $\pi/2$ phase shifted by the $\pi/2$-phase shifter 342 and the RF-amplified multiplexed RF signal are multiplied together by the multiplexer 344. An orthogonal component of the complex spread spectrum signal having the frequency band of the chip rate $R_c$ is generated through the lowpass filter 346 and the A/D converter 348. In the correlation calculator 112, the in-phase component and the orthogonal component of the complex spread spectrum signal are correlatively operated with identical spread code sequences that are multiplied by the multiplexed RF signal in the in-phase correlation calculator 351 and the orthogonal correlation value calculator 352 respectively, to calculate an in-phase correlation value and an orthogonal correlation value. Matched filters or the like are used in the in-phase correlation calculator 351 and the orthogonal correlation calculator 352. A symbol clock synchronized with the cycle of the spread code sequence multiplied by the multiplexed RF signal is generated in the initial acquisition unit 141 on the basis of the orthogonal correlation value and the in-phase orthogonal value.

Delay correction times $\{T_p-\tau_1 T_c, T_p-\tau_2 T_c, T_p-\tau_3 T_c, \ldots, T_p-\tau_n T_c\}$ (where $T_p$ is a parallel bit cycle and satisfies $T_p=1/R_p$) are given to the orthogonal correlation value and the in-phase correlation value in the delay correcting units 32(1) to 32(n) so that timing synchronization between the phase of the spread code sequence multiplied in the respective channels and the symbol clock can be established. Further, parallel demodulation data for every channel is calculated in the data demodulators 33(1) to 33(n) on the basis of the in-phase correlation value and the orthogonal correlation value calculated at a timing synchronized with the symbol clock. The multiplexed RF signal is generated by multiplexing the parallel information signal sequences multiplied by the identical spread codes.

However, since different delay times are given to the multiplexed RF signals multiplexed in the respective channels, crosscorrelation between the channels in data modulation have small values. For this reason, a demodulation operation can be performed on each channel. The parallel demodulation data is a signal having a parallel bit rate $R_p$ and having a value of "1" or "−1". Further, in the parallel/serial converter 313, demodulation data having a bit rate $R_b$ ($=nR_p$) is generated from the parallel demodulation data having parallel bit rates $R_p$ of n channels. Thus, demodulation data can be extracted from the multiplexed RF signal by the procedure explained above.

The structure and operation of the initial acquisition unit 141 will be explained below.

FIG. 10 is a block diagram showing the initial acquisition circuit of a conventional direct sequence scheme as described in "Spread Spectrum Communication System" (by Yokoyama Mitsuo, Kagakugijyutsu Shuppan-sha) pp. 325 to 329.

In FIG. 10, reference numeral 111 denotes a quasi-coherent detector; reference numeral 112 denotes a correlation value calculator; reference numerals 113 and 114 denote square calculators; reference numeral 115 denotes an adder; reference numeral 411 denotes a code synchronization point detector; reference numeral 133 denotes a symbol clock generator.

The quasi-coherent detector 111 in this conventional initial acquisition circuit generates an in-phase component (a real component) and an orthogonal component (an imaginary component) of a complex spread spectrum signal from a received RF signal.

The in-phase component and the orthogonal component of the complex spread spectrum signal generated by the quasi-coherent detector 111 are correlatively operated by the correlation value calculator 112 with the identical spread code sequences that are multiplied by the received RF signal, so that an in-phase correlation value and an orthogonal correlation value are calculated. The in-phase correlation value and the orthogonal correlation value output from the correlation value calculator 112 unit are squared by the square calculators 113 and 114. Thereafter, these values are added to each other by the adder 115 to calculate a square correlation value. Further, an acquisition pulse representing a code synchronous position is generated in the code synchronization point detector 411 when the square correlation value has the maximum value within one spread code cycle.

Finally, a symbol clock synchronized with the timing of the acquisition pulse is generated in the symbol clock generator 133. Code synchronization between the received RF signal and a spread code used in a correlator in the reception device can be established using this symbol clock.

The procedure explained above will be explained again using equations. When a transmission carrier wave angular frequency is represented by $\omega_c$, a digital information signal at time t is represented by $D_m$ (m=1, 2, 3, ... ), and a spread code sequence is represented by $c_i=\{c_0, c_1, c_2, \ldots, c_{L-1}\}$ the received RF signal f(t) can be expressed as:

$$f(t)=D_m c_i \cos(\omega_c t)+jD_m c_i \sin(\omega_c t).$$

In the following explanation, it is assumed that the frequency of a local carrier wave generated by the VCO 341 is $\omega_c$ which is equal to the transmission carrier wave angular frequency. Since the received RF signal is multiplied by the local carrier wave generated by the VCO 341 in the multiplexer unit 343, a signal r(t) filtered by the lowpass filter 345 can be expressed as:

$$r(t)=D_m c_i \cos(\Delta\theta).$$

Similarly, a signal i(t) multiplied in the multiplexer 344 and filtered by the lowpass filter 346 can be expressed as:

$$i(t)=D_m c_i \sin(\Delta\theta).$$

Here $\Delta\theta$ represents a carrier phase error between the transmission and the reception sides.

It is considered that r(t) and i(t) are correlatively operated with identical spread code sequences $c_i'=\{c_0', c_1', c_2', \ldots, c_{L-1}'\}$ as those used in the transmission device in the in-phase correlation value calculator 351 and the orthogonal correlation value calculator 352 respectively.

If the phases of the spread code sequence $c_i'$ and the spread code sequence $c_i$ are different from each other, a sum of squares of the in-phase component r(t) and the orthogonal component i(t) is small. If the phases of the spread code sequence $c_i'$ and the spread code sequence $c_i$ are equal to each other (code synchronization is established), the sum of squares of the correlation values is large because a code sequence used as spread codes has the following characteristic feature. That is, an autocorrelation value obtained when the phases of the code sequences are equal to each other is large, and a autocorrelation value obtained when the phases of the code sequences are not equal to each other is small. Therefore, the sum of squares of the correlation values of the in-phase component and the orthogonal component is large when code synchronization is established, and the sum of squares when code synchronization is not established is small. Therefore, if the sum of squares of the correlation values is calculated, a code synchronization state between a complex spread spectrum signal and a spread code used in the correlator of the reception device can be established from this sum.

When the conventional initial acquisition unit 141 explained above is used in the identical spread code multiplex SS system, parallel data sequences multiplied by identical spread code sequences and delayed are multiplied to perform data transmission. Therefore, in the correlator on the reception device side, as shown in FIG. 11, square correlation peak values of the number of times of multiplexing are exhibited within one symbol cycle. FIG. 11 is a timing chart of a square correlation value and a symbol clock when the number of times of multiplexing n=3. Thus, when the conventional initial acquisition circuit is used in the identical spread code multiplex SS system, it is disadvantageously difficult to detect a code synchronization point of the entire system (code synchronization point obtained when no delay times are not given by the spread modulator 22(1) to 22(n) in the transmission device described in the prior art) to generate a single clock.

As a method of generating a symbol clock in the identical spread code multiplex SS system, for example, a scheme using a spread code for code synchronization has been explained in Japanese Patent Application Laid-Open No. 4-360434. However, in addition to the correlation calculators 351 and 352 for data communication, another pair of correlation calculators for code synchronization are required (one for calculating an in-phase correlation value and the other for calculating an orthogonal correlation value). Thus, the circuit scale disadvantageously increases.

SUMMARY OF THE INVENTION

The present invention has been made to solve the above problem. It is the first object of this invention to obtain an initial acquisition circuit for realizing a high-precision initial acquisition characteristic for an identical spread code multiplex SS system.

It is the second object of this invention to obtain an initial acquisition circuit for an identical code multiplex SS system in which the problem of increases in the circuit scale and the power consumption can be solved because an initial acquisition operation can be realized by correlators for one channel without using a correlator for code synchronization in a demodulation operation.

In the identical spread code multiplex SS system according to this invention, a delay correction unit calculates the multiplexed square correlation value by matching the peak values and adding the square correlation values of all the multiplexed signals. Here, the multiplexed RF signal is the one generated by performing a spectrum spreading on n ($\geq 2$) parallel data sequences by multiplying the parallel data sequences by identical spread code sequences, giving n different delay times $\{\tau_1 T_c, \tau_2 T_c, \tau_3 T_c, \ldots, \tau_n T_c\}$ to the n parallel multiplied data sequences (where delay coefficients $\{\tau_1, \tau_2, \tau_3, \ldots, \tau_n\}$ are integers which satisfy $0 \leq \tau_1 < \tau_2 < \tau_3 < \ldots < \tau_n < L$, L is a spread code length, and $T_c$ is a chip cycle), and then multiplexing the n parallel multiplied data sequences.

Other objects and features of this invention will become apparent from the following description with reference to the accompanying drawings.

DESCRIPTION OF THE PREFERRED EMBODIMENTS

In a first embodiment, an initial acquisition circuit is obtained which, in order to calculate the correlation values of an in-phase component and an orthogonal component of a received signal, realizes high-precision code synchronization between a spread code sequence multiplied by a multiplexed RF signal transmitted from a transmission device of the identical code multiplex SS system described in the prior art and a spread code sequence used in despreading on a reception device side by using one correlator for each component.

Figure 1:
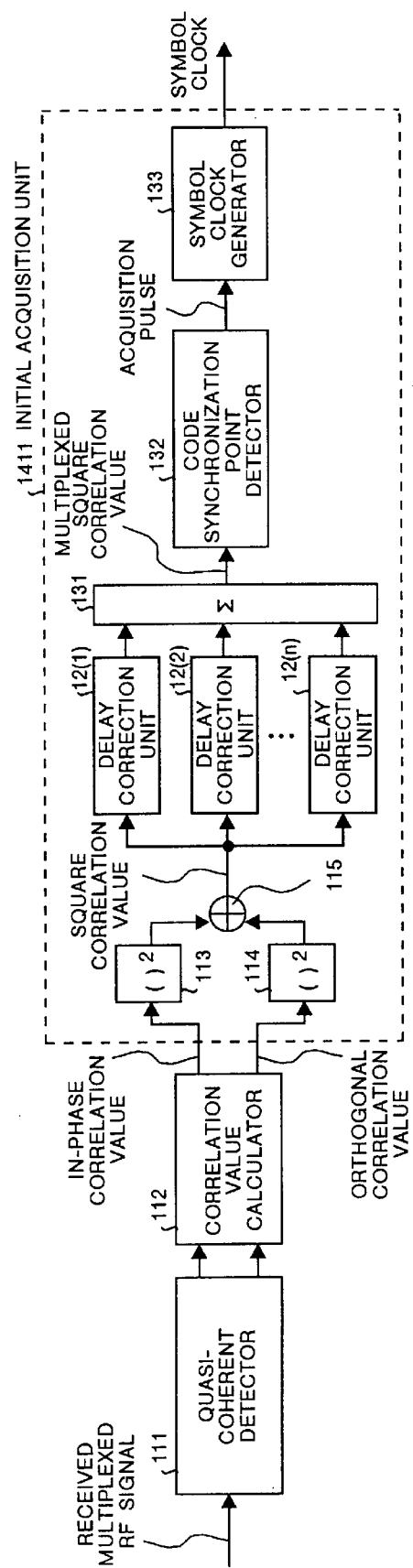
FIG. 1 is a block diagram showing an initial acquisition circuit according to a first embodiment.

FIG. 1 is a block diagram showing an initial acquisition circuit according to the first embodiment. In FIG. 1, reference numeral 111 denotes a quasi-coherent detector; reference numeral 112 denotes a correlation calculator; reference numerals 113 and 114 denote square calculators; reference numeral 115 denotes an adder; reference numeral 133 denotes a symbol clock generator; and reference numeral 1411 denotes an initial acquisition unit. Reference numeral 12(1) to 12(n) denote delay correction units; reference numeral 131 denotes a multiplexer; and reference numeral 132 denotes a code synchronization point detector.

An operation of the initial acquisition circuit according to the first embodiment will be explained below. In FIG. 1, in the initial acquisition circuit of the first embodiment, as in a conventional initial acquisition circuit, the quasi-coherent detector 111 detects an in-phase component and an orthogonal component of a complex spread spectrum signal from a received multiplexed RF signal. The in-phase component (a real component) and the orthogonal component (an imaginary component) of the complex spread spectrum signal generated by the quasi-coherent detector 111 are correlatively operated by the correlation calculator 112 with identical spread code sequences that are multiplied by the received multiplexed RF signal to calculate an in-phase correlation value and an orthogonal correlation value.

The in-phase correlation value and the orthogonal correlation values are squared by the square calculators 113 and 114 respectively, and the square values of the respective components are added to each other by the adder 115. Thus, a square correlation value is obtained.

Figure 11:
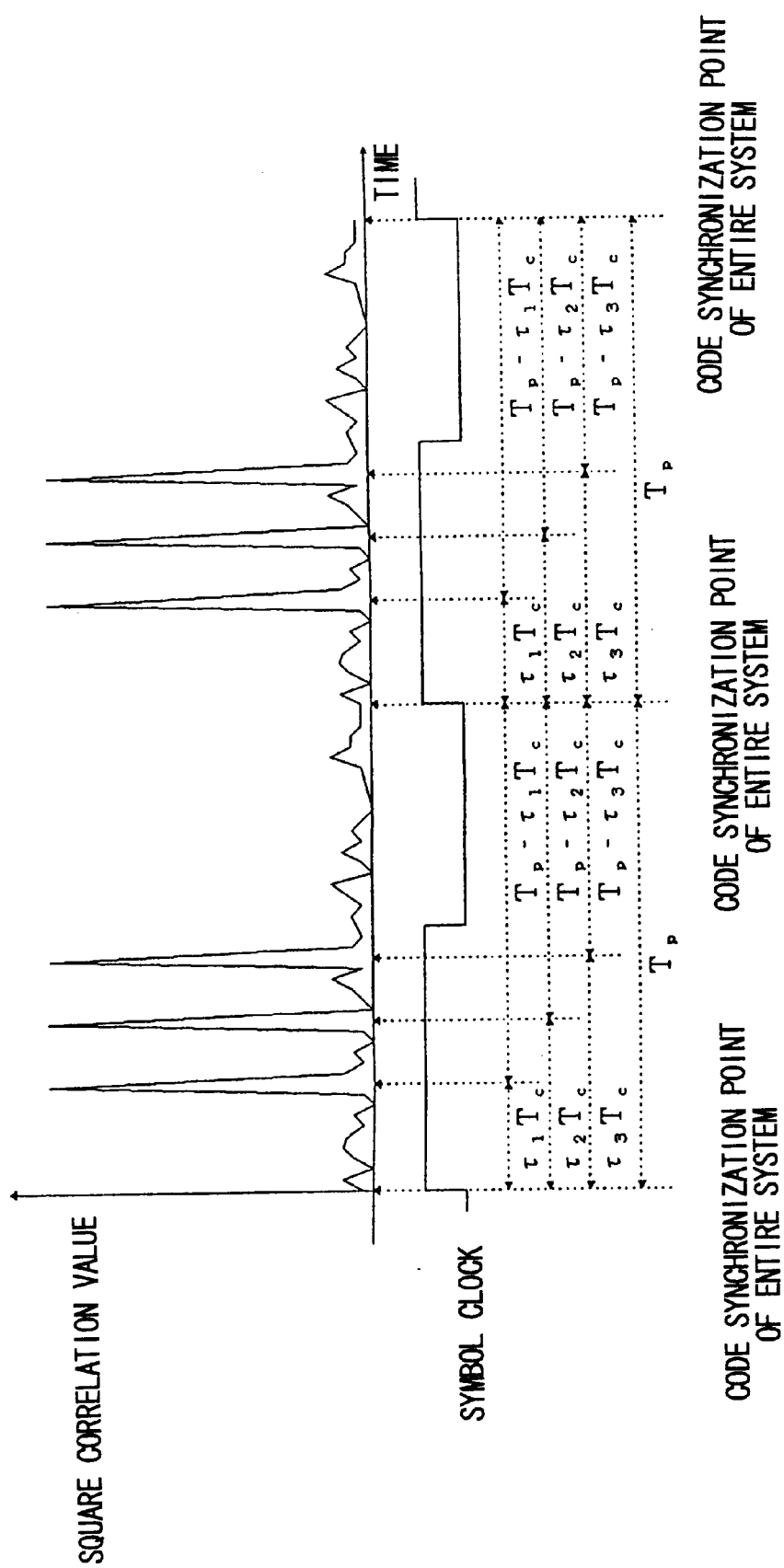
FIG. 11 is a timing chart of a square correlation value and a symbol clock when the multiplex number n=3.

Since the square correlation value acquires a peak value when code synchronization of the spread codes multiplied by the sequences is established, the square correlation values of the sequences are generated, as shown in FIG. 11, at timings delayed from the code synchronization point of the entire system by delay times $\{\tau_1 T_c, \tau_2 T_c, \tau_3 T_c, \ldots, \tau_n T_c\}$ (where delay coefficients $\{\tau_1, \tau_2, \tau_3, \ldots, \tau_n\}$ are integers which satisfy $0 \leq \tau_1 < \tau_2 < \tau_3 < \ldots < \tau_n < L$, L is a spread code length, and $T_c$ is a chip cycle) given by the spread modulators 22(1) to 22(n) in the transmission device described in the prior art, respectively.

Therefore, the square correlation value is divided into n square correlation values. Delay correction times $\{(Y-\tau_1)T_c, (Y-\tau_2)T_c, (Y-\tau_3)T_c, \ldots, (Y-\tau_n)T_c\}$ (where Y is an integer which satisfies $Y \geq \tau_n$) are given to the n divided square correlation values by using the delay correcting units 12(1) to 12(n) to uniform correlation peak timings of the n square correlation values. Further, all the n square correlation values delayed by the delay correction units 12(1) to 12(n) are added to each other by the multiplexer 131 to calculate a multiplexed square correlation value. Square correlation values and a multiplexed square correlation value obtained when the multiplex number n=3 and Y=L are shown in FIGS. 4 and 5.

Figure 4:
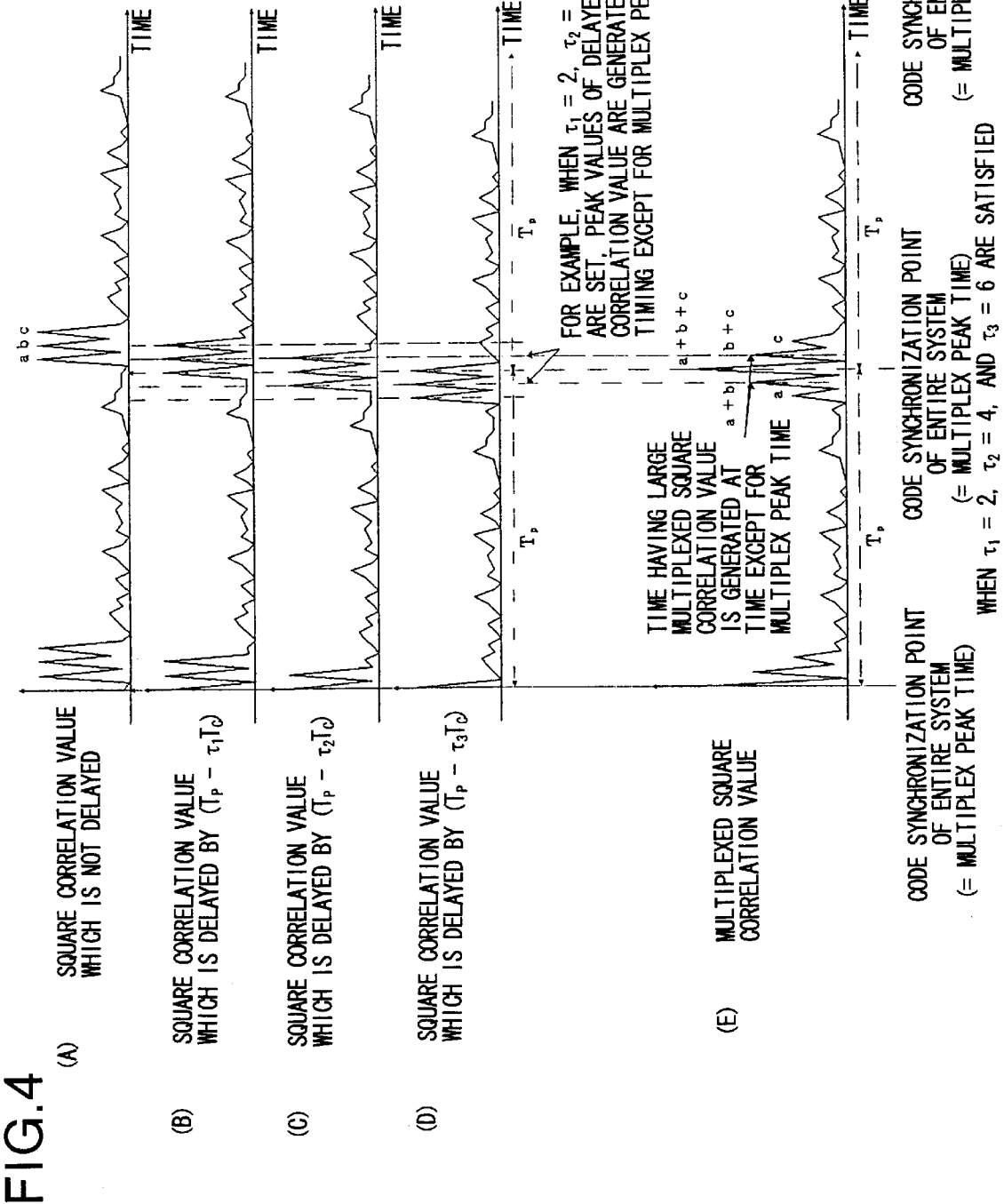
FIG. 4 shows square correlation values and multiplexed square correlation values obtained when the multiplex number n=3 and Y=L ($\tau_1=2$, $\tau_2=4$, and $\tau_3=6$)
Figure 5:
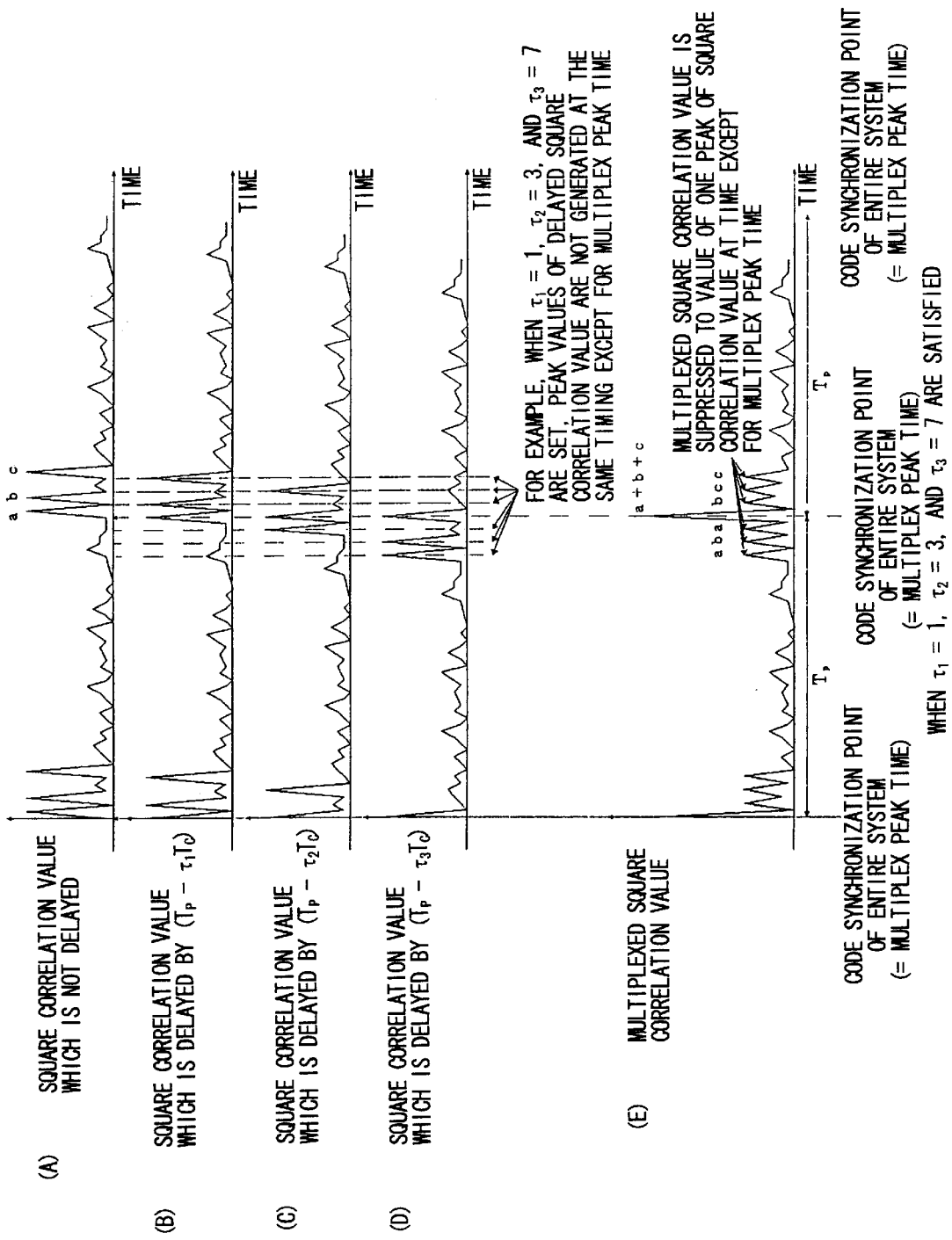
FIG. 5 shows square correlation values and multiplexed square correlation values obtained when the multiplex number n=3 and Y=L ($\tau_1=1$, $\tau_2=3$, and $\tau_3=7$)

FIG. 4 shows correlation values obtained when $\tau_1$=2, $\tau_2$=4, and $\tau_3$=6, and FIG. 5 shows correlation values obtained when $\tau_1$=1, $\tau_2$=3, and $\tau_3$=7.

As shown in FIGS. 4 and 5, a multiplexed square correlation value obtained such that the peak values of the n square correlation values are uniformly added to each other by using the delay correction units 12(1) to 12(n) has a large peak value at a time (to be referred to as multiplexed peak time hereinafter) corresponding to Y from the code synchronization point of the entire system every one spread code cycle. In FIGS. 4 and 5, since Y=L, multiplex peak time coincides with the time corresponding to the code synchronization point of the entire system. The code synchronization point of the entire system can be detected in the first embodiment by the above procedure.

Figure 6:
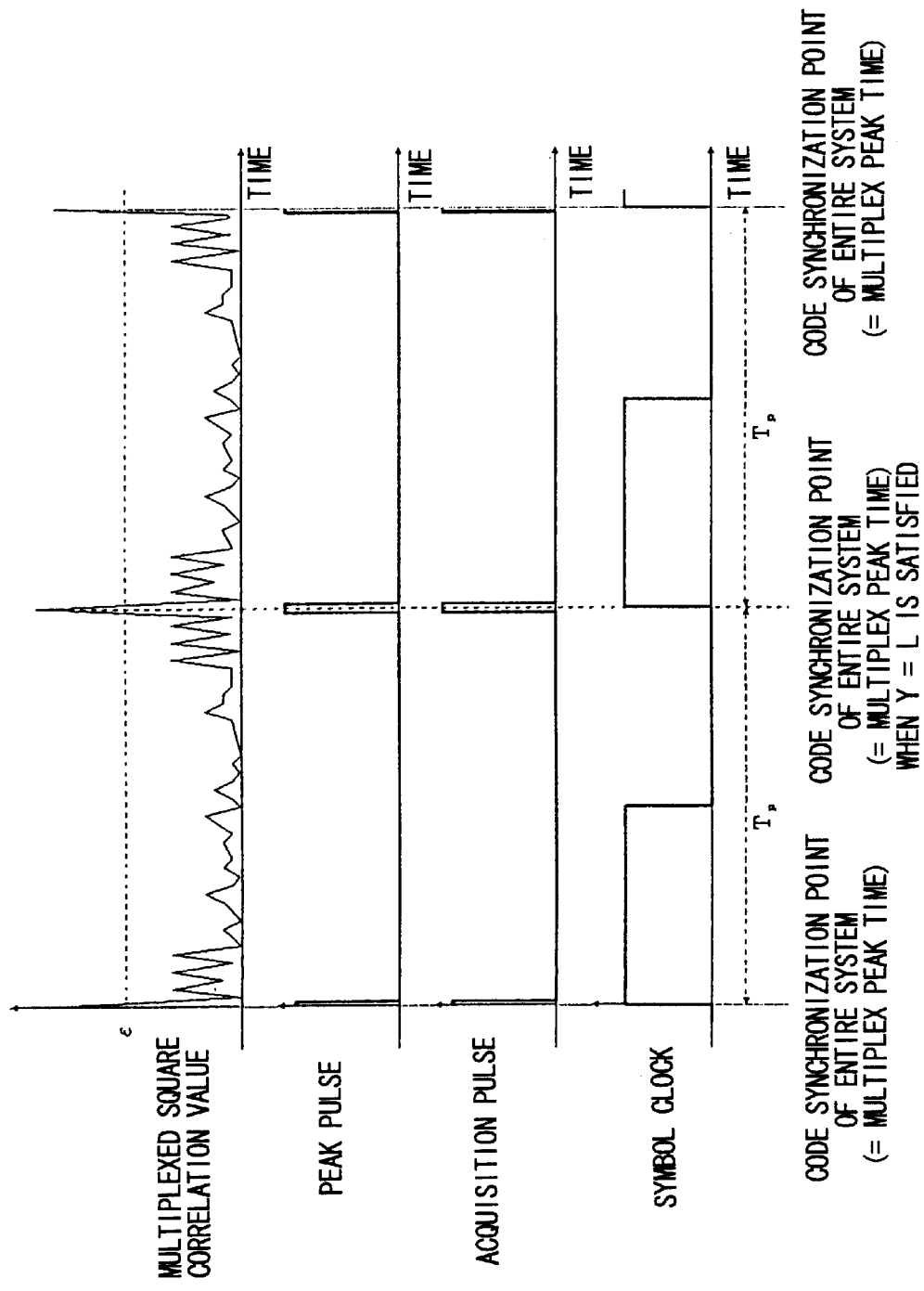
FIG. 6 is a timing chart showing a multiplexed square correlation value, an acquisition pulse, and a symbol clock when Y=L.
Figure 7:
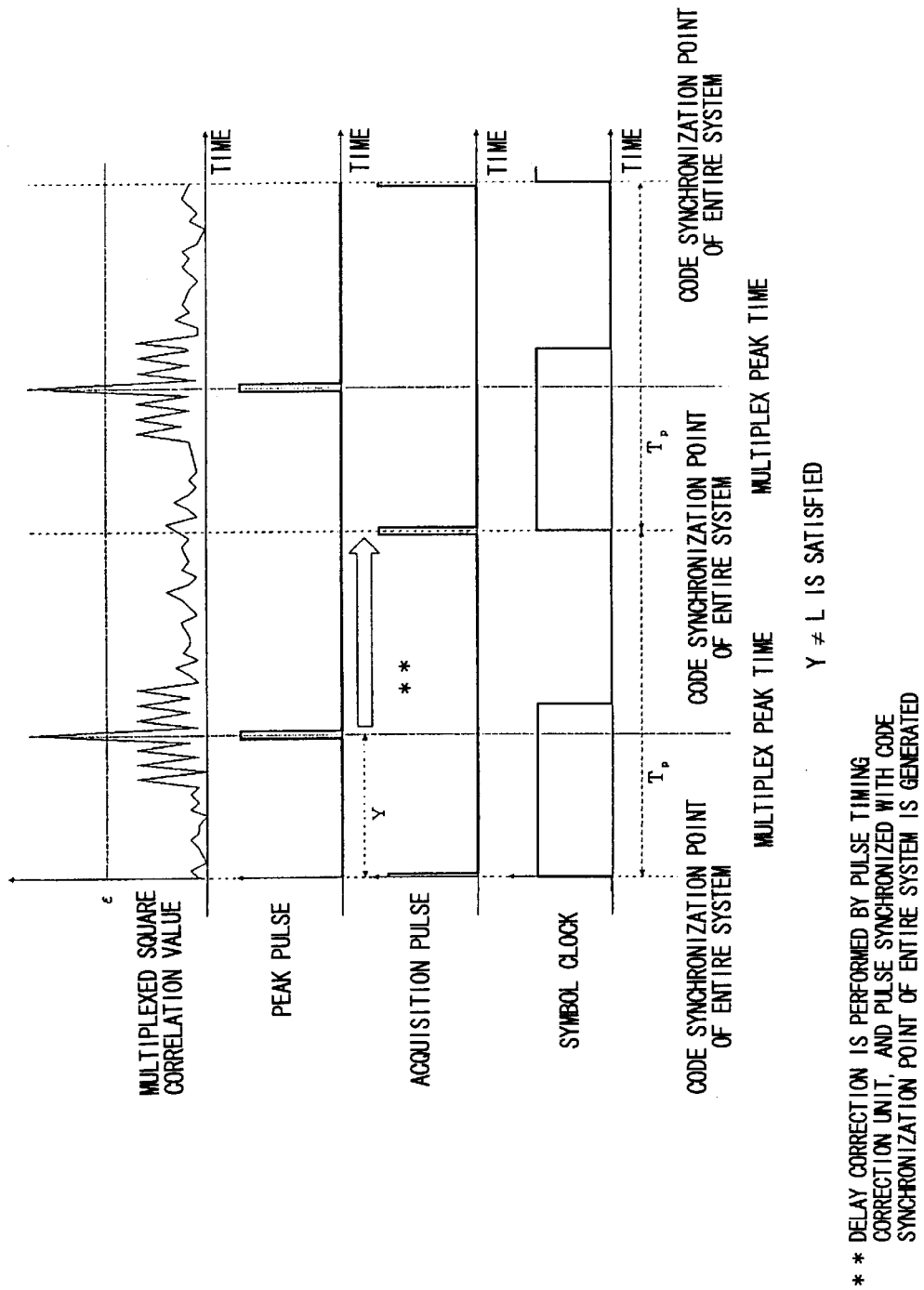
FIG. 7 shows a timing chart showing a multiplexed square correlation value, an acquisition pulse, and a symbol clock when Y≠L.
Figure 8:
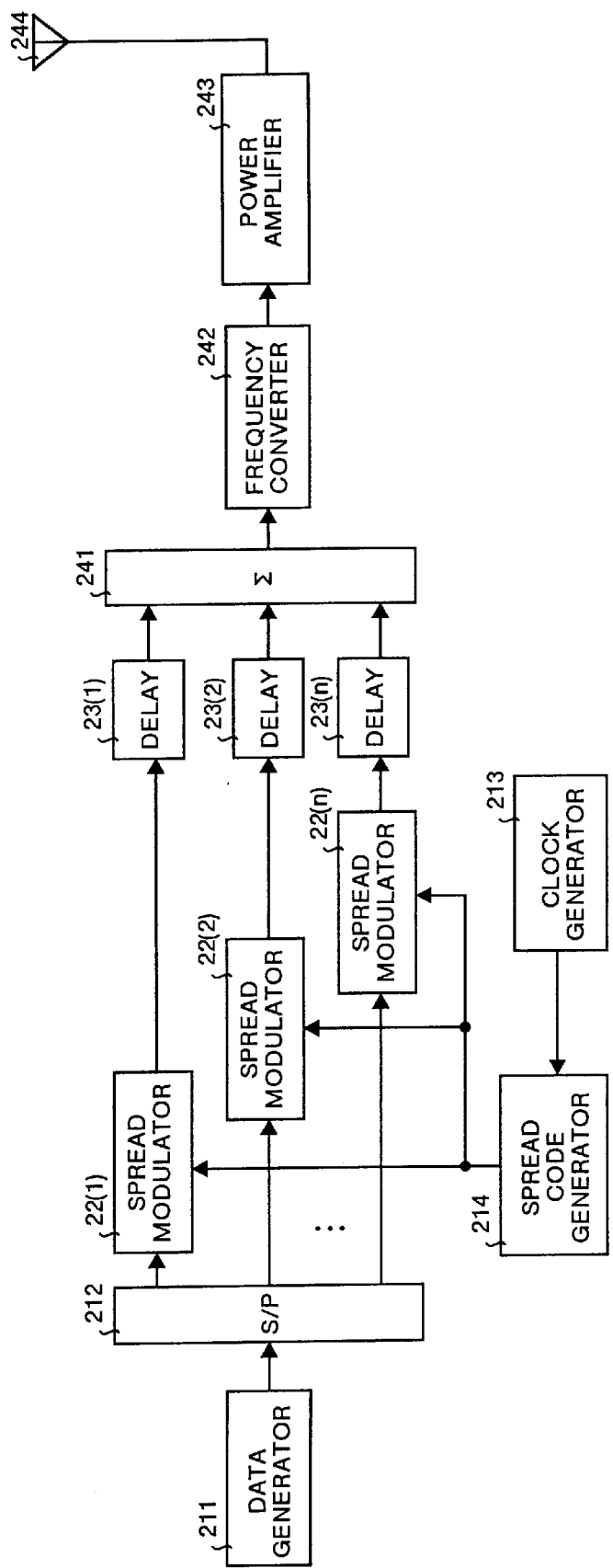
FIG. 8 is a block diagram of a transmission device of a conventional identical spread code multiplex SS system.
Figure 9:
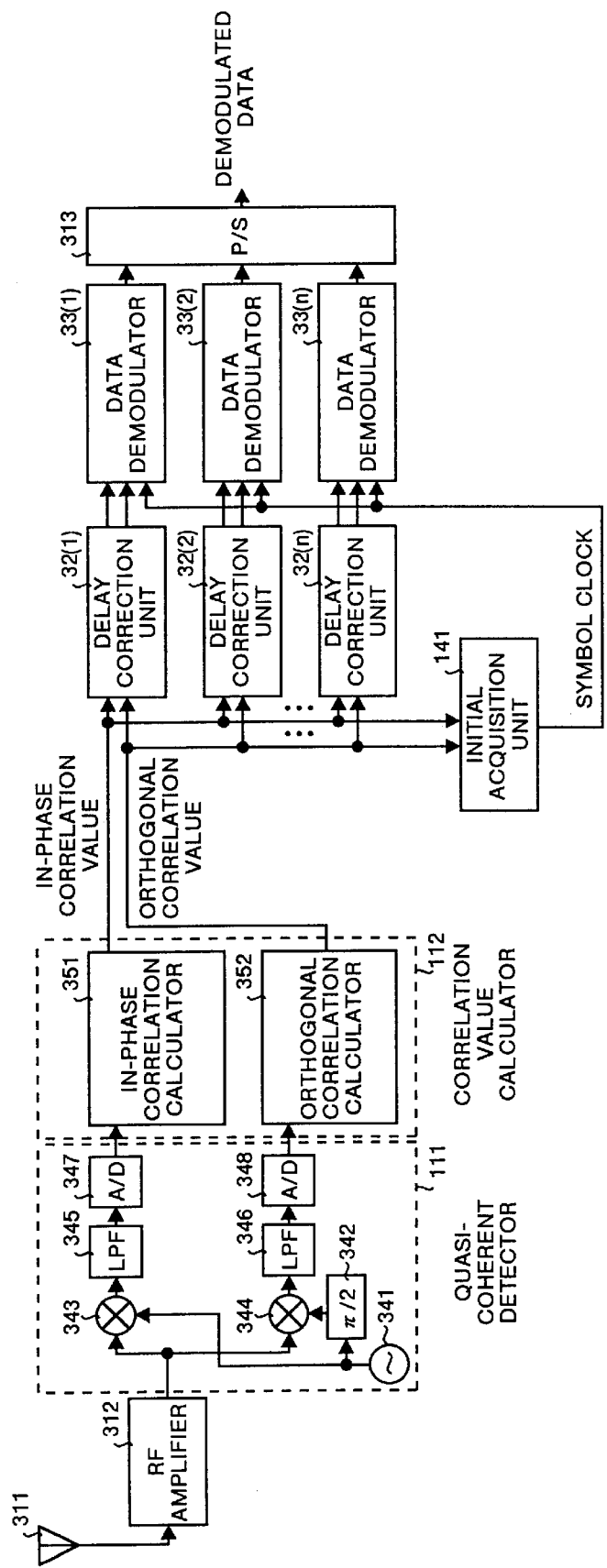
FIG. 9 is a block diagram of a reception device of a conventional identical spread code multiplex SS system.
Figure 10:
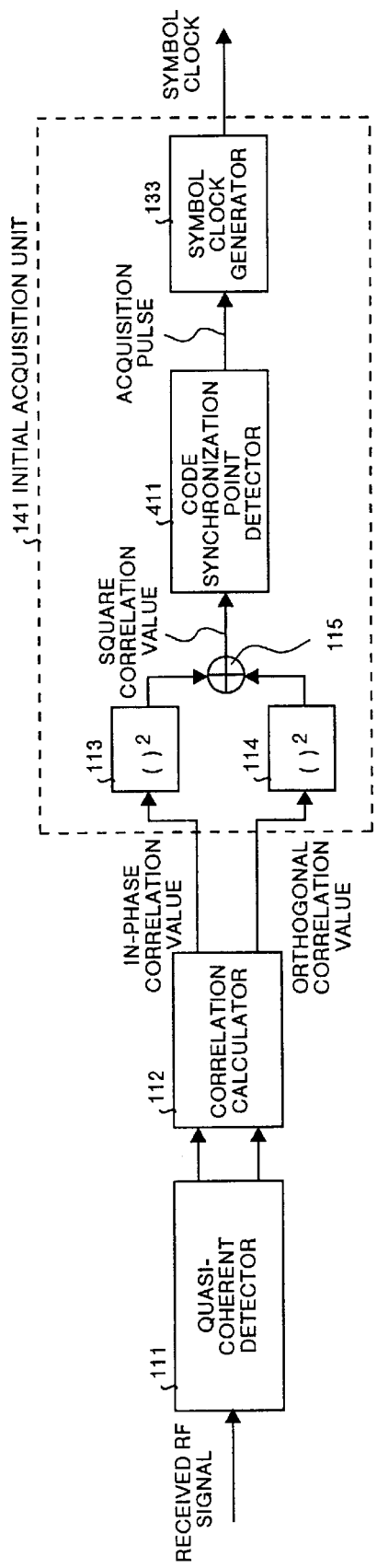
FIG. 10 is a block diagram of an initial acquisition unit using a conventional direct spread scheme.

Further, FIGS. 6 and 7 show timing charts of multiplexed square correlation values, acquisition pulses, and symbol clocks when Y=L and when Y≠L respectively. As shown in FIGS. 6 and 7, by using the code synchronization point detector 132, the code synchronization point of the entire system is estimated on the basis of multiplex peak time (in FIG. 6, since Y=L, the multiplex peak time coincides with time having the code synchronization point of the entire system), and an acquisition pulse synchronized with the code synchronization point of the entire system is generated.

Finally, the symbol clock generator 134 generates a symbol clock synchronized with the timing of the acquisition pulse. Code synchronization between a received complex spread spectrum signal and a spread code used in the correlator of the reception device can be established using this symbol clock.

In the initial acquisition circuit of this embodiment, as shown in FIG. 4, two or more peak values of the square correlation value subjected to delay correction in each channel may be simultaneously generated (in FIG. 4, the peak values are generated at time given by multiplex peak time±2 chip times). In such a case, since the value of multiplexed square correlation is large at a time other than the multiplex peak time, the possibility that the code synchronization point of the entire system is erroneously determined due to the influence of thermal noise or the like increases.

Therefore, when the multiplex number n satisfies $n \leq \log_2(L+1)$, values set such that delay coefficients $\{\tau_1, \tau_2, \tau_3, \ldots, \tau_n\}$ satisfy $\tau_i = 2^{m_i-1}-1$ (where $m_i$ is an integer which satisfies $1 \leq m_1 < m_2 < m_3 < \ldots < m_n \leq \log_2(L+1)$, and i=1, 2, 3, ..., n) are given by the spread modulators 22(1) to 22(n) in the identical spread code multiplex SS system described in the prior art. In this case, two or more peak values of the delayed square correlation value in each channel are not simultaneously generated at any time other than the multiplex peak time as shown in FIG. 5. For this reason, since the multiplexed square correlation value at the multiplex peak time is suppressed to a small value, the possibility that the code synchronization point of the entire system is erroneously determined can be reduced.

As explained above, in the initial acquisition circuit of the first embodiment, with respect to a RF signal multiplexed such that different specific delay times are given to parallel transmission information sequences multiplied by identical spread codes, code synchronization can be realized by using only one correlator for each of the orthogonal component and the in-phase component. Thus, as compared to a scheme (Japanese Patent Application Laid-Open No. 4-360434) which requires a conventional correlator for communication and one correlator for code synchronization, a reduction in size of the demodulator and a lower power consumption can be realized.

In the initial acquisition circuit of the first embodiment, since all the multiplexed square correlation values summed up by the delay correction unit are used, in comparison with an initial acquisition circuit described in the prior art (using the conventional direct spread scheme described in "Spread Spectrum Communication System" pp. 325 to 329), a highly precise initial acquisition characteristic can be realized.

In addition, when a multiplex number n satisfies $n \leq \log_2(L+1)$, values set such that delay coefficients $\{\tau_1, \tau_2, \tau_3, \ldots, \tau_n\}$ satisfy $\tau_i = 2^{m_i-1}-1$ (where $m_i$ is an integer which satisfies $1 \leq m_1 < m_2 < m_3 < \ldots < m_n \leq \log_2(L+1)$, and i=1, 2, 3, ..., n) are given by the spread modulators 22(1) to 22(n) in the identical spread code multiplex SS system described in the prior art. In this case, the value of the multiplexed square correlation value can be decreased at time except for the multiplex peak time. Therefore, the initial acquisition circuit of the first embodiment can obtain a more preferable initial acquisition characteristic.

In the first embodiment, a case of Y=L is explained. However, if $Y \geq \tau_n$ is satisfied, any integer may be used. In this case, as shown in FIG. 7, when an acquisition pulse is output a mod(L−mod(Y, L), L) chip cycle after multiplex peak time is detected by the code synchronization point detector 132, an acquisition pulse synchronized with the code synchronization point of the entire system can be obtained (mod (A, B) is the remainder obtained by dividing A by B).

A second embodiment explains a code synchronization point detection circuit in which accumulative addition (cyclic addition) in one symbol cycle is performed to a multiplexed square correlation value in the first embodiment described above to generate a high-precision acquisition pulse synchronized with the code synchronization point of an entire system.

Figure 2:
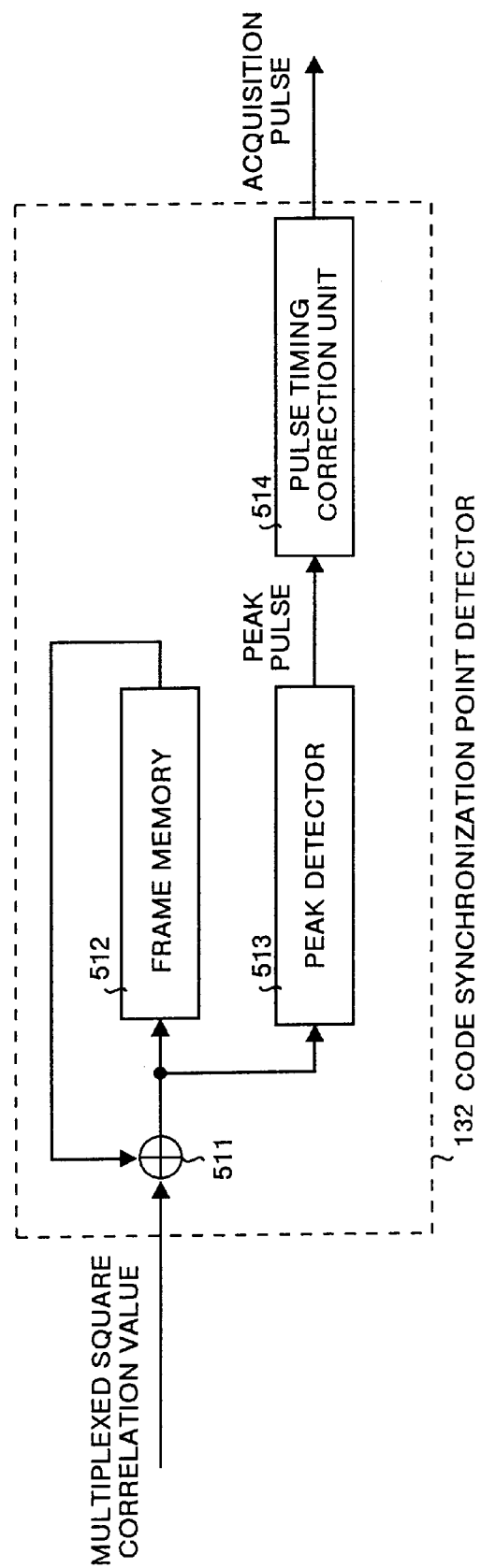
FIG. 2 is a block diagram showing a code synchronization point detection circuit according to a second embodiment.

FIG. 2 is a block diagram showing the code synchronization point detector 132 according to the second embodiment. In FIG. 2, reference numeral 511 denotes an adder; reference numeral 512 denotes a frame memory for storing an accumulative addition result of one symbol cycle; reference numeral 513 denotes a peak detector for detecting the maximum value of the accumulative addition result in the frame memory to generate a peak pulse at a detection position; and reference numeral 514 denotes a pulse timing correction unit for correcting a timing at which the peak pulse is generated in order to generate an acquisition pulse generated in synchronism with a code synchronization point of the entire system.

Operation of the code synchronization point detector 132 according to the second embodiment of the present invention will be described below.

When data transmission is performed in a transmission-path environment in which no thermal noise or the like exists as described in the first embodiment, the multiplexed square correlation value has the maximum value at multiplex peak time. For this reason, in the code synchronization point detector 132 of the second embodiment, with respect to the multiplexed square correlation value, accumulative addition (cyclic addition) of the multiplexed square correlation value is performed in one symbol cycle by using the adder 511 and the frame memory 512. When the cyclic addition is performed, the S/N ratio of the multiplexed square correlation value can be improved even in a transmission-path environment in which thermal noise or the like exists. Results of cyclic addition in one symbol cycle are stored in the frame memory 512. Further, the peak detector 513 detects the maximum value of the cyclic addition values stored in the frame memory 512, and generates a peak pulse at a detection position.

In this case, generation time of the peak pulse is a point in time corresponding to Y from the code synchronization point of the entire system. For this reason, when the peak pulse is delayed by a mod(L−mod(Y, L), L) chip cycle time by the pulse timing correction unit 514, as shown in FIG. 7, an acquisition pulse synchronized with the code synchronization point of the entire system can be generated.

As described above, in the second embodiment, the S/N ratio of the multiplexed square correlation value can be increased by performing cyclic addition. Therefore, the possibility that the peak value of the multiplexed square correlation value subjected to cyclic addition by the peak detector 513 is erroneously detected at a time other than the code synchronization point of the entire system can be reduced, and a preferable initial acquisition characteristic can be realized.

A third embodiment explains a code synchronization point detection circuit in which an acquisition pulse synchronized with a code synchronization point of an entire system is generated by comparing the multiplexed square correlation value in the first embodiment described above with a predetermined threshold. The third embodiment can also be realized by a simple and small-scale circuit used in a preferable transmission-path environment which is only slightly affected by thermal noise or the like.

Figure 3:
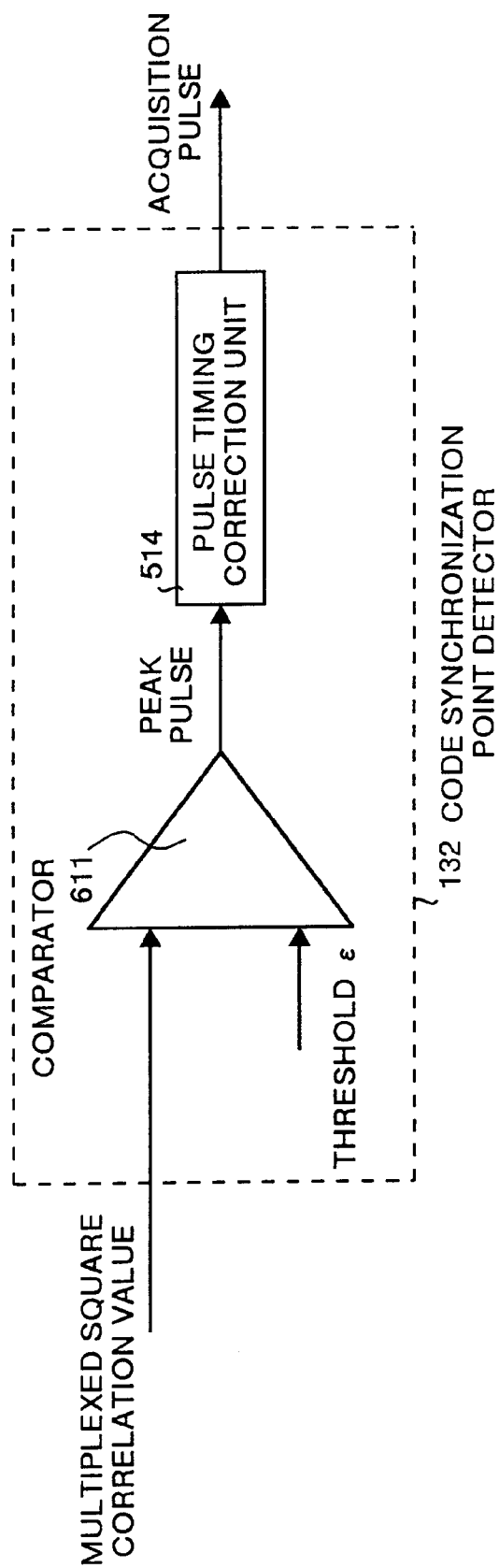
FIG. 3 is a block diagram showing a code synchronization point detection circuit according to a third embodiment.

FIG. 3 is a block diagram showing the code synchronization point detector 132 of the third embodiment. In FIG. 3, reference numeral 611 denotes a comparator for comparing the multiplexed square correlation value in the first embodiment described above with a threshold $\epsilon$, and reference numeral 514 denotes the same pulse timing correction unit as that used in the second embodiment described above.

Operation of the code synchronization point detection circuit according to the third embodiment of the present invention will be explained. FIGS. 6 and 7 show timing charts of multiplexed square correlation values, acquisition pulses, and symbol clocks (in FIG. 6, since Y=L, multiplex peak time coincides with time having the code synchronization point of the entire system). As shown in FIGS. 6 and 7, when data transmission is performed in a preferable transmission-path environment, the multiplexed square correlation value has the maximum value at multiplex peak time. For this reason, a threshold $\epsilon$ is set in such a manner that it can detect only the maximum value of the multiplexed square correlation value at multiplex peak time. The threshold value $\epsilon$ is compared to the multiplexed square correlation value in the comparator 511. If the multiplexed square correlation value is larger than the threshold $\epsilon$ then a peak pulse signal is turned on; where as if the multiplexed square correlation value is smaller than the threshold value $\epsilon$ then the peak pulse signal is turned off, so that a peak pulse can be generated.

As in the case of the second embodiment, when the peak pulse is delayed by a mod(L−mod(Y, L), L) chip cycle time by the pulse timing correction unit, as shown in FIG. 7, an acquisition pulse synchronized with the code synchronization point of the entire system can be generated.

As described above, since the code synchronization detection circuit of the third embodiment can be constituted only by a comparator and a delay, the code synchronization detection circuit can be realized by a simple and small-scale circuit configuration.

As described above, in the identical spread code multiplex SS system according to this invention, since correlators for only one channel without using a correlator for code synchronization realize an initial acquisition operation, a reduction in size of a demodulator and a low power consumption can be realized. Further, since the multiplexed square correlation values are calculated by adding the squared values of all the multiplexed signals, a highly precise initial acquisition characteristic can be realized.

Further, the multiplexed square correlation value in one symbol cycle are cyclically added. Therefore, the possibility that a peak value of the multiplexed square correlation value is erroneously detected is reduced.

Further, since the acquisition pulse is generated by using only a comparator and a delay, the circuit is simple and small-scale.

Although the invention has been described with respect to a specific embodiment for a complete and clear disclosure, the appended claims are not to be thus limited, but are to be construed as embodying all modifications and alternative constructions that may occur to one skilled in the art which fairly fall within the basic teaching herein set forth.

What is claimed is:

1. An initial acquisition circuit which receives a multiplexed RF signal, said multiplexed RF signal being generated by performing a spectrum spreading on n ($\geq 2$) parallel data sequences by multiplying the n parallel data sequences by identical spread code sequences, giving n different delay times $\{\tau_1 T_c, \tau_2 T_c, \tau_3 T_c, \ldots, \tau_n T_c\}$ (where delay coefficients $\{\tau_1, \tau_2, \tau_3, \ldots, \tau_n\}$ are integers which satisfy $0 \leq \tau_1 < \tau_2 < \tau_3 < \ldots < \tau_n < L$, L is a spread code length, and $T_c$ is a chip cycle) to the multiplied n parallel data sequences, and then multiplexing the multiplied n parallel data sequences, said initial acquisition circuit comprising:

a quasi-coherent detector which multiplies local carrier waves that are orthogonal to each other to the received multiplexed RF signal and removes a harmonic component from the received multiplexed RF signal to generate a complex spread spectrum signal;

a correlation calculator which calculates an in-phase correlation value and an orthogonal correlation value between the complex spread spectrum signal and the spread code sequences multiplied by the parallel data sequences of the received multiplexed RF signal;

a square calculator which calculates squares of the in-phase correlation value and the orthogonal correlation value;

an adder which adds the square of the in-phase correlation value and the square of the orthogonal correlation value to each other and calculates a square correlation value;

a delay correction unit which divides the square correlation value into n square correlation values, and gives delay times $\{(Y-\tau_1)T_c, (Y-\tau_2)T_c, (Y-\tau_3)T_c, \ldots, (Y-\tau_n)T_c\}$ (where Y is an integer such that $Y \geq \tau_n$) to the n divided square correlation values to uniform correlation peak timings;

a multiplexer which adds all the n square correlation values subjected to delay correction to each other and calculates a multiplexed square correlation value;

a code synchronization point detector which estimates a code synchronization point on the basis of a time when the multiplexed square correlation value exhibits a maximum value and generates an acquisition pulse at a timing synchronized with the code synchronization point; and a symbol clock generator for generating a symbol clock synchronized with the acquisition pulse.

2. The initial acquisition circuit according to claim 1, wherein said code synchronization point detector comprises, an adder which performs accumulative addition of the multiplexed square correlation value in one spread code cycle;

a frame memory which stores the result of the accumulative addition of one spread code cycle;

a maximum value detector which generates a peak pulse when the accumulative addition results stored in the frame memory exhibits a maximum value; and a pulse timing correction unit which performs delay correction to the peak pulse to generate an acquisition pulse synchronized with a code synchronization point.

3. The initial acquisition circuit according to claim 1, wherein said code synchronization point detector comprises, a comparator which compares the multiplexed square correlation value with a predetermined threshold, detects a peak time, and generates a peak pulse at the peak time; and a pulse timing correction unit which performs delay correction to the peak pulse to generate an acquisition pulse synchronized with a code synchronization point.

4. The initial acquisition circuit according to claim 1, wherein the delay coefficients $\{\tau_1, \tau_2, \tau_3, \ldots, \tau_n\}$ of said delay correction unit have values given by $\tau_i = 2^{m_i-1} - 1$ (where $m_i$ is an integer which satisfies $1 \leq m_1 < m_2 < m_3 < \ldots < m_n \leq \log_2(L+1)$, and i=1, 2, 3, ... n).

* * * * *